(12) United States Patent
Hayes et al.

(10) Patent No.: US 6,548,985 B1
(45) Date of Patent: Apr. 15, 2003

(54) MULTIPLE INPUT SINGLE-STAGE INDUCTIVE CHARGER

(75) Inventors: John G. Hayes, Kinsale (IR); Christopher P. Henze, Lakeville, MN (US); Ray G. Radys, Santa Monica, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/104,138

(22) Filed: Mar. 22, 2002

(51) Int. Cl.[7] ............................................... H01M 10/46
(52) U.S. Cl. ....................................................... 320/108
(58) Field of Search ............................... 320/108, 109; 363/17, 21.02, 37, 170

(56) References Cited

U.S. PATENT DOCUMENTS 5,633,577 A * 5/1997 Matsumae et al.
6,160,374 A   12/2000 Hayes et al. ................ 320/108
6,184,651 B1 * 2/2001 Fernandez et al.
6,362,979 B1 * 3/2002 Gucyski

* cited by examiner

*Primary Examiner*—Edward H. Tso
(74) *Attorney, Agent, or Firm*—Christopher DeVries

(57) ABSTRACT

An inductive charger includes a rectifier that can be connected to both single- and three-phase power sources. The rectifier includes first, second and third legs that include first and second diodes. Alternately, the third leg includes first and second silicon-controlled rectifiers. A capacitor is connected across an output of the rectifier. An inverter is connected to the rectifier and the capacitor and includes a plurality of switching circuits. A series resonant tank circuit is connected to an output of the inverter. A charge coupler and an inductive inlet include a transformer and a parallel resonant tank circuit for coupling energy to a load. A controller is connected to the rectifier and the inverter. The controller generates drive signals for controlling the switching circuits. The inductive charger is capable of providing approximately 0.99 power factor from single-phase and 0.91 power factor at twice the output power from three-phase power sources.

21 Claims, 2 Drawing Sheets

MULTIPLE INPUT SINGLE-STAGE INDUCTIVE CHARGER

TECHNICAL FIELD

The present invention relates to charging systems for electric vehicles, and more particularly to a power-factor-corrected, single-stage inductive charger for use in inductive charging of electric vehicle batteries.

BACKGROUND OF THE INVENTION

Electric vehicles are gaining popularity due to increased emissions requirements. The electric vehicles require a highly efficient, reliable and safe electric drive train to compete with vehicles powered by internal combustion (IC) engines. The electric vehicles rely upon batteries that must be charged periodically. Inductive charging systems or converters are typically used to charge the batteries.

Conventional inductive charging systems include two main components. The first component includes an inductive charger that is located separately from the electric vehicle. The inductive charger conditions and converts low-frequency AC supply power to high-frequency AC power. An inductive coupler (or plug) connects the inductive charger to the electric vehicle.

The second component includes an on-vehicle inductive inlet (or socket) that mates with the inductive coupler of the inductive charger. The high-frequency AC power that is provided by the inductive charger is transformer-coupled to the electric vehicle via the inductive inlet. The high-frequency AC power is rectified and filtered to generate a DC current that charges the batteries.

The current electric vehicle inductive chargers that are manufactured by the assignee of the present invention are known as Standard Charge Modules and Convenience Charge Modules. These inductive chargers have two series power stages that process the power from the utility line to the inductive coupler. The first stage, which is typically a boost-type converter, corrects the power factor of the current that is drawn from the rectified low-frequency AC power line. The power factor correction maximizes the available power and minimizes the AC line current and voltage distortion. The first stage additionally converts the rectified utility low-frequency AC power to high-voltage DC by filtering using large electrolytic capacitors.

The second power processing stage has two functions: (1) controlling the output power to the battery and (2) conditioning the high-frequency AC voltage and current for input to the inductive cable and coupler. The second stage includes a resonant inverter with MOSFET switches and a series tank circuit that includes an inductor and a capacitor. The resonant inverter chops the high voltage DC that is produced by the first stage into high-frequency AC. The high-frequency AC is filtered by the series tank circuit and fed into a cable that is connected to a winding of the inductive coupler. A parallel or resonant tank shunts energy away from the battery as the frequency is increased.

The resonant inverter operates at a frequency above the natural frequency of the series tank circuit to enable soft switching of the inverter MOSFETs. The super-resonant operation also provides highly efficient power transfer. The power transferred from the utility to the battery is regulated by controlling the operating frequency of the resonant inverter. Decreasing the operating frequency increases current to the battery. Increasing the operating frequency decreases current to the battery.

The inductive charging for electric vehicles is standardized using the Society of Automotive Engineers Inductive Charge Coupling Recommended Practice, SAE J-1773. SAE J-1773 defines a common electric vehicle conductive charging system and architecture and the functional requirements of the vehicle inlet and mating connector. The inductive charging vehicle inlet that is defined by SAE J-1773 contains two passive elements; the transformer magnetizing inductance; and a discrete capacitance connected in parallel with the transformer secondary.

SUMMARY OF THE INVENTION

An inductive charger according to the present invention is capable of charging using both single-phase and three-phase power sources. A rectifier is capable of being connected to both single- and three-phase power sources. A capacitor is connected across an output of the rectifier. An inverter is connected to the rectifier and the capacitor and includes a plurality of switching circuits. A series resonant tank circuit is connected to an output of the inverter. A charge coupler and an inductive inlet include a transformer and a parallel resonant tank circuit for coupling energy to a load. A controller is connected to the rectifier and the inverter. The controller generates drive signals for controlling the switching circuits, operates the inductive charger in a super-resonant mode and regulates output power to the battery by modulating an operating frequency and output current of the inductive charger around an input frequency and an input current.

In other features of the invention, the parallel tank circuit includes a first inductor connected in parallel to a first capacitor. The series tank circuit includes a second inductor connected in series to a second capacitor. The load is a battery of an electric vehicle.

In still other features, the inverter is a full-bridge or half-bridge inverter. The full-bridge inverter includes four switching circuits each with a controlled switch, an anti-parallel diode, and a snubber capacitor. When the power supply is a single-phase power supply, the inductive charger is capable of providing a power factor of approximately 0.99. When the power supply is a three-phase power supply, the inductive charger is capable of providing a power factor of approximately 0.91.

In still other features, the rectifier includes first, second and third legs. Each of the first, second and third legs include first and second diodes. Alternately, the first and second legs include first and second diodes and the third leg includes first and second controlled switches such as silicon controlled rectifiers.

The controller includes an amplifier that generates a current reference signal from the input current. An attenuator produces a voltage reference signal from the input voltage. A multiplier generates a product signal based on the voltage reference signal and a power command signal. A differential circuit generates an error signal and has an inverting input connected to the current reference signal and a non-inverting input connected to the product signal. A compensator generates a compensated signal from the error signal so that the error signal is minimized, thus correcting the power factor by making the input current and input voltage have the same shape. A gate driver produces drive signals for the switching circuits of the inverter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application, or uses.

Figure 1:
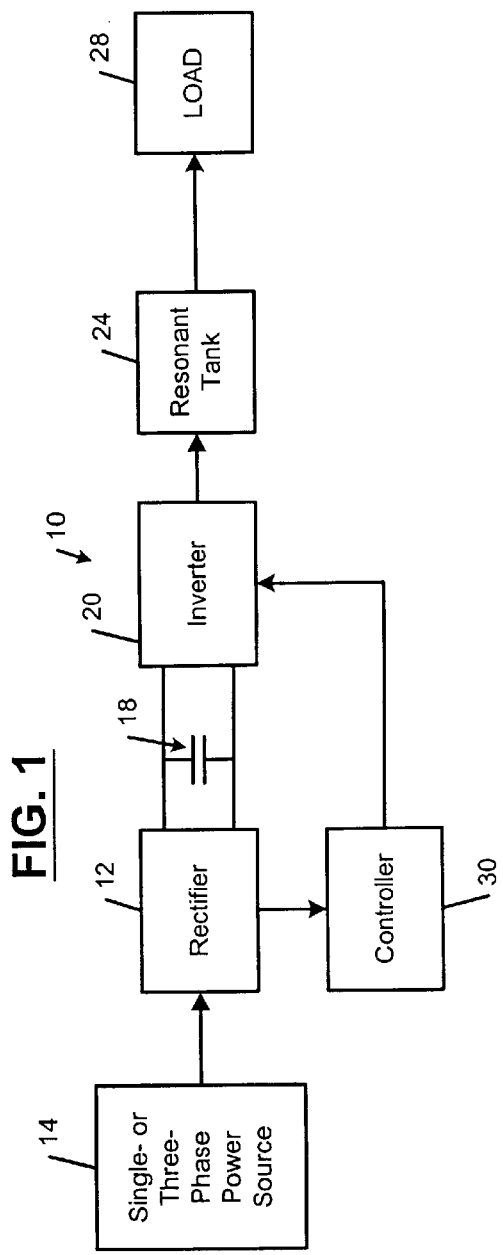
FIG. 1 is a simplified functional block diagram of a single-stage inductive charger and battery load according to the present invention.

Referring now to FIG. 1, a single-stage inductive charger 10 according to the present invention is illustrated and includes a rectifier 12 that is connected to a power source 14 during charging. A capacitor 18 is connected to an output of the rectifier 12. An inverter 20 is connected to the capacitor 18 and includes a plurality of switching circuits (not shown). A resonant tank circuit 24 is connected to an output of the inverter 20. A load 28 such as a battery or a bank of batteries is connected to an output of the resonant tank circuit 24. A controller 30 is connected to outputs of the rectifier 12 and to the inverter 20. The controller 30 generates gate drive signals that control the switching circuits in the inverter 20 as will be described more fully below.

The power source 14 can be a single-phase power source or a three-phase power source. The capacitor 18 is preferably a small, high-frequency capacitor that provides a filtering effect. The capacitor 18 does not need to be a bulky and heavy electrolytic capacitor that is typically required by the conventional two-stage inductive chargers. The inverter 20 is preferably a full-bridge or half-bridge inverter. Preferably, the switching circuits in the inverter 20 are MOSFET-based switching circuits.

Figure 2B:
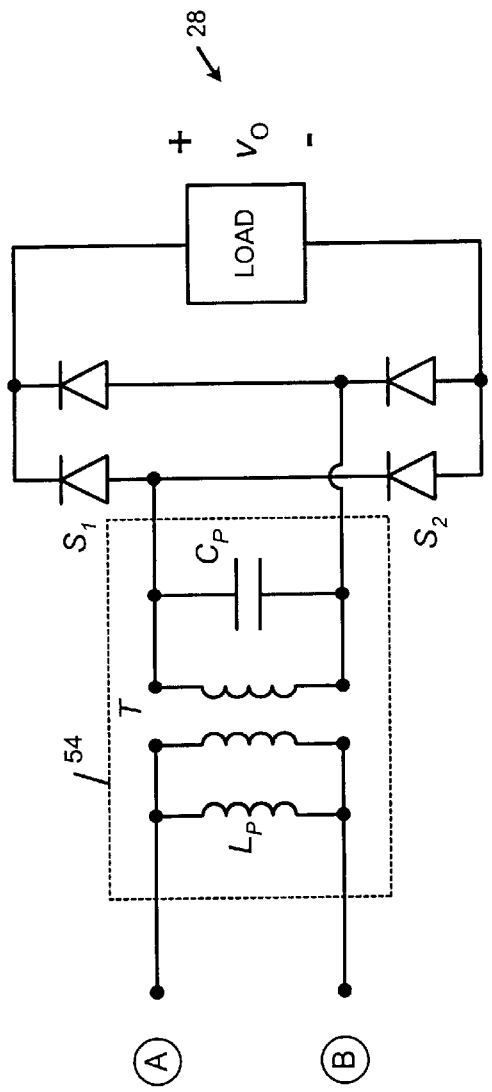
FIGS. 2A and 2B are electrical schematics illustrating the single-stage inductive charger and battery load of FIG. 1 in further detail.
Figure 2A:
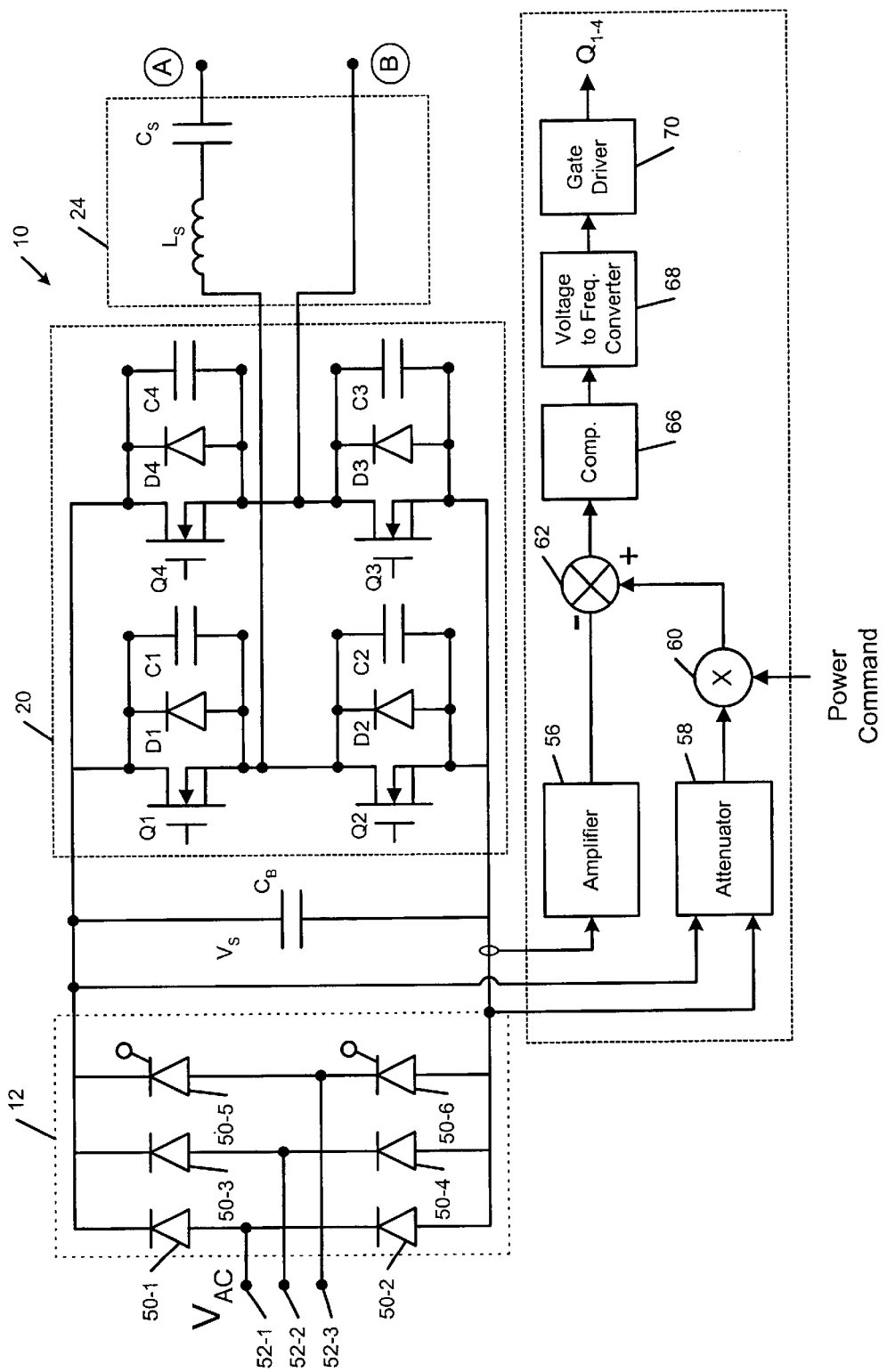

Referring now to FIGS. 2A and 2B, the single-stage inductive charger 10 and the load 28 are shown in further detail. The circuit illustrated in FIG. 2A connects with the circuit shown in FIG. 2B at points A and B. The rectifier 12 includes a plurality of diodes 50-1, 50-2, . . . , and 50-6. A first node 52-1 is connected to an anode of the diode 50-1 and to a cathode of the diode 50-2. A second node 52-2 is connected to an anode of the diode 50-3 and to a cathode of the diode 50-4. A third node 52-3 is connected to an anode of the diode 50-5 and to a cathode of the diode 50-6. If a single-phase source is employed, the single-phase source is preferably connected to nodes 52-1 and 52-2. The diodes 50-5 and 50-6 of the rectifier 12 can optionally be controlled switches such as silicon-controlled rectifiers (SCRs). The inverter 20 that is illustrated in FIG. 2A is a full-bridge inverter that includes controlled switches $Q_{1-4}$, anti-parallel diodes $D_{1-4}$, and snubber capacitors $C_{1-4}$.

The resonant tank circuit 24 is preferably a series tank circuit with a series inductor $L_S$ and capacitor $C_S$. A charge coupler and inductive inlet 54 includes a parallel tank circuit with a parallel inductor $L_P$ and capacitor $C_P$ that are located on opposite sides of a transformer T. As can be appreciated, the parallel inductor $L_P$ can be positioned on the same side of the transformer T as the capacitor $C_P$. The charge coupler and inductive inlet 54 preferably meets a standard that is set forth in SAE J-1773, which is hereby incorporated by reference. The parallel capacitor $C_P$ is connected to one or more diodes and/or switches $S_1$ that are connected to the load 28. The charge coupler and inductive inlet 54 can be replaced by a single transformer. If a single transformer is used, conductive rather than inductive charging occurs. The ability to provide twice the power output is not changed.

The controller 30 includes an amplifier 56 that amplifies AC line current ($I_{AC}$) and produces a reference current signal. A voltage attenuator 58 rectifies and attenuates line voltage ($V_{AC}$) to provide a voltage reference signal. The voltage reference signal is preferably an alternating signal such as a sinusoidally-shaped signal. The voltage reference signal is input to a multiplier 60. A DC power command signal is input to the multiplier 60. The multiplier 60 produces a first reference signal.

The first reference signal from the multiplier 60 is input to a non-inverting input of a difference circuit 62. The current reference signal is input to an inverting input of the difference circuit 62 to provide feedback. The difference circuit 62 outputs a difference between the current reference signal and the first reference signal to a compensator 66 that generates a compensation signal. The compensation signal is input to a frequency converter 68. An output of the frequency converter 68 is input to a gate driver 70. The gate driver 70 is connected to the switches $Q_{1-4}$ of the inverter 20 and provides gate drive signals to the switches $Q_{1-4}$.

The single-stage inductive charger 10 operates in a super-resonant mode and regulates power to the load 28 by increasing the operating frequency to reduce output current for a given input voltage. The single-stage inductive charger 10 is compatible with the inductive charging standard that is set forth in SAE J-1773. The single-stage inductive charger 10 may optionally be connected to single-phase or three-phase input power sources. No internal changes to the single-stage inductive charger 10 are required for the dual power source operation.

When operating from the single-phase source, the single-stage inductive charger 10 provides both power factor correction and output battery power regulation. The single-stage inductive charger 10 produces an input power factor of approximately 0.99. Battery power may be regulated from zero to a maximum level. For example, in an exemplary embodiment, the battery power may be regulated up to 6 kilowatts (kW).

When operating from a three-phase source, the single-stage inductive charger 10 delivers from zero up to approximately twice the maximum output power that was provided from the single-phase power source. In the example given above, the single-stage inductive charger 10 is capable of delivering 12 kW from the three-phase power source. Power factor correction is still obtained; however, the maximum power factor is reduced somewhat. Typical power factor values of approximately 0.91 can be obtained.

A third leg of the rectifier 12 may include SCRs. The SCRs allow the single-stage inductive charger 10 to have a hardware default to the single-phase power source mode even if the single-stage inductive charger 10 is connected to the three-phase power source. This feature provides compatibility with existing electric vehicles.

The incremental cost to have the single-stage inductive charger 10 operate with both single- and three-phase power sources and to have twice the output power with three-phase sources is relatively minor. This is due in part to the fact that the circuit components such as the resonant elements and the switching transistors are designed for peak loads. In both the single- and three-phase power source modes, the peak loads on the circuit components are the same. In the single-phase power source mode, the average load on the circuit components is 0.5 of the peak load. In the three-phase power source mode, the average component load is 0.95 of the peak load. The only additional circuit components that are required are the SCRs for the third leg of the rectifier 12 and the associated terminals and wiring.

In both the single-phase and three-phase operating modes, the single-stage inductive charger 10 provides both power factor correction and output battery power regulation with a relatively low parts count. The single-stage inductive charger 10 is fully soft switched over the line voltage and the power range which results in high efficiency. Advantageously, the single-stage inductive charger 10 uses the inherent current source operation of a series-parallel resonant circuit feeding the SAE J-1773 interface to provide voltage gain for PFC over the full AC line cycle. The operating frequency of the single-stage inductive charger 10 is modulated around the current-source frequency to regulate the output battery power from zero to full load.

The inductive coupling contains a discrete capacitor component in addition to low magnetizing and high leakage inductances. Driving the inductive coupling with a variable-frequency, series-resonant single-stage inductive charger 10 results in topology with desirable features. The transformer and cable leakage inductances are absorbed into the larger series inductances. A relatively high transformer turns ratio minimizes primary current stress. The charger has a buck/boost voltage gain and current source operation. The charger has monotonic power transfer characteristics over a wide load range and throttling capability down to no-load. High-frequency operation, narrow modulation frequency range, and use of zero-voltage-switched MOSFETS with slow integral diodes also improve performance. The charger has inherent short-circuit protection, soft recovery of output rectifiers, secondary dv/dt control and current waveshaping for enhanced electromagnetic compatibility.

The current-source operation significantly enhances the operation of the single-stage inductive charger 10 as a single-phase PFC or three-phase PFC stage in addition to output power regulation. Close to the current-source frequency, the single-stage inductive charger 10 is capable of providing sufficient gain over the utility line cycle to implement PFC. The root-mean-squared (rms) input current and the output power are controlled by varying or modulating the frequency of the single-stage inductive charger 10 about the current-source frequency.

The single-stage inductive charger 10 reduces the complexity, volume and electrical parts cost and count while greatly increasing reliability through the elimination of the electrolytic capacitors. The single-stage inductive charger also offers optional installation in single- and three-phase power source locations while doubling the output power capacity for the three-phase power source locations.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An inductive charger that is capable of using both single-phase and three-phase power sources, comprising:
    a rectifier that can be connected to both single- and three-phase power sources;
    a capacitor connected across an output of said rectifier;
    an inverter that is connected to said rectifier and said capacitor and that includes a plurality of switching circuits;
    a series resonant tank circuit connected to an output of said inverter;
    a charge coupler and an inductive inlet including a transformer and a parallel resonant tank circuit for coupling energy to a load; and
    a controller that is connected to said rectifier and said inverter, that generates drive signals for controlling said switching circuits, that operates said inductive charger in a super-resonant mode and that regulates output power to said battery by modulating an operating frequency and output current of said inductive charger around an input frequency and an input current.

2. The inductive charger of claim 1 wherein said parallel tank circuit includes a first inductor connected in parallel to a first capacitor and said series tank circuit includes a second inductor connected in series to a second capacitor.

3. The inductive charger of claim 1 wherein said load is a battery of an electric vehicle.

4. The inductive charger of claim 1 wherein said inverter is a full-bridge inverter.

5. The inductive charger of claim 4 wherein said inverter includes four switching circuits each with a controlled switch, an anti-parallel diode, and a snubber capacitor.

6. The inductive charger of claim 1 wherein when said power supply is a single-phase power supply, said inductive charger provides a power factor of approximately 0.99.

7. The inductive charger of claim 1 wherein when said power supply is a three-phase power supply, said inductive charger provides a power factor of approximately 0.91.

8. The inductive charger of claim 1 wherein said rectifier includes first, second and third legs, and wherein each of said first, second and third legs include first and second diodes.

9. The inductive charger of claim 1 wherein said rectifier includes first, second and third legs, and wherein both said first and second legs include first and second diodes and said third leg includes first and second controlled switches.

10. The inductive charger of claim 9 wherein said controlled switches are silicon-controlled rectifiers.

11. The inductive charger of claim 1 wherein said controller includes:
    an amplifier that generates a current reference signal from said input current;
    an attenuator that produces a voltage reference signal from said input voltage;
    a multiplier that generates a product signal based on said voltage reference signal and a power command signal;
    a differential circuit that generates an error signal and that has an inverting input connected to said current reference signal and a non-inverting input connected to said product signal;
    a compensator that generates a compensated signal from said error signal; and
    a gate driver that produces drive signals for said switching circuits of said inverter.

12. The inductive charger of claim 11 wherein said attenuator rectifies and attenuates said AC line voltage.

13. The inductive charger of claim 1 wherein said inductive charger has a first output power when connected to said single-phase power source and approximately twice said first output power when connected to said three-phase power source.

14. An inductive charger system comprising:
- a rectifier that can be connected to both single-phase and three-phase power sources and wherein said rectifier includes first, second and third legs;
- a filter capacitor coupled across said rectifier;
- an inverter coupled to said rectifier and said filter capacitor;
- a series resonant tank circuit coupled to said inverter;
- a charge coupler and inductive inlet including a transformer and a parallel resonant tank circuit for coupling energy to a load; and
- a controller for regulating power supplied to said load by increasing said operating frequency of said system to reduce output current for a given voltage.

15. The inductive charger of claim 14 wherein said inductive charger system has a first output power when connected to said single-phase power source and approximately twice said first output power when connected to said three-phase power source.

16. The system recited in claim 14 wherein said filter capacitor comprises a high frequency non-electrolytic filter capacitor.

17. The system recited in claim 14 wherein said inverter includes a MOSFET-based full-bridge inverter.

18. The system recited in claim 14 wherein said inverter comprises a MOSFET-based half-bridge inverter.

19. The system recited in claim 14 wherein said load includes batteries of an electric vehicle.

20. The system recited in claim 14 wherein said full bridge inverter includes a plurality of controlled switches, intrinsic anti-parallel diodes, and snubber capacitors to facilitate zero-voltage-switching.

21. The system recited in claim 20 wherein first and third switches of said inverter are gated to second and fourth switches of said inverter in a complementary fashion.

* * * * *